United States Patent [19]

Brenek

[11] Patent Number: 5,842,333
[45] Date of Patent: Dec. 1, 1998

[54] ADJUSTABLE HEAD ASSEMBLY FOR COTTON HARVESTER

[76] Inventor: Allen W. Brenek, 11169 W. Jarrett Rd., San Angelo, Tex. 76905

[21] Appl. No.: 839,135

[22] Filed: Apr. 23, 1997

Related U.S. Application Data

[60] Provisional application No. 60/016,637 Apr. 25, 1996.
[51] Int. Cl.$^6$ .................................................. A01D 46/14
[52] U.S. Cl. .............................. 56/28; 56/14.5; 460/119
[58] Field of Search ................................. 56/28, 30, 98, 56/106, 119, 330, 51, 153, 192, 208, 14.5, 14.3; 460/119

[56] References Cited

U.S. PATENT DOCUMENTS

| | | |
|---|---|---|
| 3,298,162 | 1/1967 | Medd . |
| 4,255,919 | 3/1981 | Copley et al. . |
| 4,344,271 | 8/1982 | Schlueter et al. . |
| 4,522,018 | 6/1985 | Blakeslee .............................. 56/192 X |
| 4,803,830 | 2/1989 | Junge et al. . |
| 4,896,492 | 1/1990 | Junge et al. ................................ 56/28 |
| 5,063,728 | 11/1991 | Garter et al. . |
| 5,077,960 | 1/1992 | Covington . |
| 5,081,828 | 1/1992 | Covington et al. . |
| 5,099,635 | 3/1992 | Butkovich et al. . |
| 5,212,937 | 5/1993 | Fachini et al. . |
| 5,343,677 | 9/1994 | Covington et al. ...................... 56/28 X |
| 5,359,836 | 11/1994 | Zeuner et al. ......................... 56/208 X |

*Primary Examiner*—Michael J. Carone
*Assistant Examiner*—Robert Pezzuto
*Attorney, Agent, or Firm*—Richard C. Litman

[57] ABSTRACT

A laterally adjustable harvester head assembly for a cotton harvesting machine has a width greater than the remainder of the machine, and is selectively linearly movable from a normally centered position at the front of the machine to a laterally offset position. The normally centered position is essentially laterally symmetrical relative to the remainder of the machine and is the position of choice for the head assembly during cotton harvesting operations, with the ends of the harvester head extending past the sides of the wheeled portion of the machine in order to harvest a greater number of rows simultaneously. The laterally offset position displaces the head assembly laterally from its centered position, to essentially align one end of the head assembly with the corresponding side of the harvester machine. The typical cotton harvester collects the cotton in a side dumping collector basket, and the present laterally movable harvester head allows the head assembly to be repositioned for dumping to allow the harvester machine to be positioned immediately adjacent a receiving bin for the cotton, thus improving the efficiency of the dumping operation.

The movable head is secured to a vertically adjustable frame by an upper and a lower track or rail, and is actuated by a hydraulic ram which is controlled remotely from the cab of the harvester machine.

16 Claims, 6 Drawing Sheets

ADJUSTABLE HEAD ASSEMBLY FOR COTTON HARVESTER

REFERENCE TO RELATED PATENT APPLICATION

This application claims the benefit of U. S. Provisional patent application Ser. No. 60/016,637, filed on Apr. 25, 1996.

BACKGROUND OF THE INVENTION

1. Field of the Invention

The present invention relates generally to agricultural and harvesting machines and equipment, and more particularly to a laterally adjustable head assembly for a cotton harvester. The present head assembly may be moved laterally by remote control from the harvester cab, to allow the harvesting machine to be maneuvered more closely to a collection vehicle for dumping the collection basket of the harvester when it is filled.

2. Description of the Related Art

Mechanized cotton harvesters conventionally include a relatively wide head assembly extending laterally across the front of the machine, with several harvester or picker heads mounted thereon. This allows the machine to harvest cotton from several rows simultaneously. As the rows are typically spaced from as little as thirty inches up to forty inches apart, and perhaps up to six picking head units are installed on a single assembly/ the resulting assembly may be sixteen feet or more in width.

Yet the cab, collection basket, wheels, and drive system for the harvester may only be eight feet wide or so, with the lateral head assembly extending outwardly to each side of the central portion of the harvester by four feet or more. The cotton collection basket of the machine is typically installed rearwardly, with cotton being delivered from the picking heads to the basket by an auger or other conveyance means. When the basket is filled, the harvester must be maneuvered to a receiving truck or other suitable container, and the harvester basket dumped into the receiver. The harvester baskets are generally automated to dump laterally, which means that the harvester must maneuver laterally close to the receiver in order to dump the filled basket efficiently. This is extremely difficult or perhaps impossible to do, depending upon the relative positioning of the various vehicles or receptacles, other obstacles, etc. Thus, cotton is often spilled during the dumping operation from harvester to another vehicle or container.

Accordingly, a need will be seen for a laterally displaceable harvesting head assembly for a cotton harvester, which assembly may be displaced laterally to one side to position the opposite end evenly with the side of the remainder of the harvester structure. This permits the harvester to be maneuvered easily to a position immediately adjacent the receiving vehicle or container, and for the harvester collection basket to be dumped directly into the receiver, thus greatly reducing spillage. A discussion of the related art known to the present inventor, and its differences and distinctions from the present invention, is provided below.

U.S. Pat. No. 3,298,162 issued on Jan. 17, 1967 to Robert E. Medd describes a Forage Harvester And Corn Picker, comprising a tractor conveyed apparatus with a pair of laterally spaced apart corn pickers and a third picking head disposed outboard of the balance of the apparatus, and adapted to harvest silage or forage from the field. The forwardmost corn picking head assembly is narrower than the rear track of the tractor, and thus there is no need to move them laterally, as they are already within the lateral bounds of the tractor. The forage head is disposed forwardly of a trailing collection wagon, with the side of the wagon extending laterally at least as far as the lateral extent of the forage head. Thus, there is no motivation to move any of the picking heads of the Medd apparatus laterally, as they are already within the lateral bounds of the remainder of the apparatus.

U. S. Pat. No. 4,255,919 issued on Mar. 17, 1981 to Russell D. Copley et al. describes a Cotton Harvester With An Offset Head. Four picking or harvesting head units are disclosed, disposed laterally along the lateral head assembly. Three of the units are symmetrically positioned within the lateral track of the machine, but the fourth is displaced outboard to the side opposite that toward which the collection basket dumps, so the machine may be maneuvered close to the receiver for dumping. However, Copley et al. do not provide for any movement of the head assembly, thus limiting the width of the entire head assembly, unlike the full width of the present laterally movable head assembly.

U.S. Pat. No. 4,344,271 issued on Aug. 17, 1982 to Francis E. Schlueter et al. describes a Head Assembly For A Cotton Harvester, comprising a fixed central head assembly having a width essentially the same as that of the remainder of the machine, but including means for the removable attachment of a lateral head extension to the central assembly. The extension may be attached to either end of the central assembly, but must be bolted and unbolted to the central assembly each time. The present harvester head assembly does not include any removable lateral extensions thereto, but rather provides for the entire head assembly to be moved laterally across the front of the harvester, to enable one end of the head assembly to clear any lateral obstructions so the harvester may maneuver immediately adjacent any obstructions to that side as desired. The operation of the present laterally adjustable head assembly is controlled remotely from within the cab of the machine, and the operator need not leave the machine or use tools to perform the operation, as required by Schlueter et al.

U.S. Pat. No. 4,803,830 issued on Feb. 14, 1989 to Steve A. Junge et al. describes a Support Arrangement For Cotton Harvester Row Units, allowing the individual head units to be adjusted laterally along the lateral head assembly for differing spacing between rows or for maintenance, etc. However, Junge et al. make no disclosure of any means of laterally articulating the head assembly itself to provide lateral clearance to the side, but only provide for moving the individual units along the fixed head assembly.

U.S. Pat. No. 5,063,728 issued on Nov. 12, 1991 to Lee F. Garter et al. describes an Apparatus For Mounting A Row Unit For Lateral Movement, comprising a fixed main row unit with a removably attachable extension therefor. The apparatus is thus more closely related to the device of the Schlueter et al. '271 patent discussed further above, than to the present invention. The same problem noted in Schlueter et al., i.e., the need to attach and remove the head assembly extension manually, exists in the Garter et al. machine, whereas the present machine provides a single, unitary head assembly which is laterally movable by means of remote controls within the cab of the harvester.

U. S. Pat. No. 5,077,960 issued on Jan. 7, 1992 to Michael J. Covington describes a Latching Mechanism For A Harvesting Unit Of A Cotton Harvester. A plurality of harvesting head units are adjustably disposed along a lateral tool bar at the front of the machine. The Covington mechanism provides a means for repositioning each of the head units along the bar, as desired. However, Covington does not provide for the movement of the bar itself in any way. The bar thus remains fixedly extended beyond the lateral dimensions of the balance of the vehicle, unlike the movable head assembly of the present cotton harvester invention.

U.S. Pat. No. 5,081,828 issued on Jan. 21, 1992 to Michael J. Covington et al. describes a Method Of Accessing Adjacent Harvesting Units Of A Cotton Harvester. The patent also discloses hingedly foldable extensions on the ends of the main, fixed tool bar to which the individual harvesting heads are attached. However, the extensions fold rearwardly to lie parallel to the fixed main bar and adjacent thereto. The main bar, and any extension folded therealong, must extend beyond the lateral limits of the remainder of the machine, as any harvester head unit remaining attached to the extension would swing outwardly and then rearwardly as the extension was folded. The harvester head unit attached to the extension would thus be positioned along side the lateral boundaries of the balance of the machine when folded, to avoid interference with the remainder of the machine. The present invention provides a means of moving the entire harvester head assembly laterally to one side, so that side of the machine may be clear of any harvester head components extending therefrom, unlike the Covington et al. device.

U.S. Pat. No. 5,099,635 issued on Mar. 31, 1992 to George M. Butkovich et al. describes a Drive System For A Cotton Harvester, using a plurality of gearboxes which permit the alignment of the interconnecting driveshafts sufficiently closely so as to allow the use of U-joints as connectors, rather than more costly constant velocity joints. Butkovich et al. are silent regarding any adjustability of the harvester head assembly relative to the harvester vehicle, as provided by the present invention.

Finally, U.S. Pat. No. 5,212,937 issued on May 25, 1993 to Robert M. Fachini et al. describes a Cotton Harvester having a generally conventional configuration, but including means for separating trash (leaves, stems, etc.) from the harvested cotton before depositing the cotton into the collection basket disposed to the rear of the machine. A laterally elongate frame is disclosed, which supports a plurality of individual cotton harvesting head units thereon. While the frame is vertically adjustable to provide height adjustment for the harvesting heads, no lateral adjustment is disclosed in the Fachini et al. patent, as provided by the present invention.

None of the above inventions and patents, either singly or in combination, is seen to describe the instant invention as claimed.

SUMMARY OF THE INVENTION

The present invention comprises a laterally adjustable head assembly for a cotton harvesting machine, and a cotton harvester having such a laterally adjustable head assembly. The head assembly includes a plurality of harvester or picking heads affixed therealong, with the head assembly normally being disposed symmetrically to each side of the harvester. Such harvesters conventionally have collection baskets which are configured to dump laterally, into a collection receptacle to one side of the harvester machine. When the collection basket of the present harvester is filled, the head assembly may be moved laterally to the opposite side from that to which the basket dumps, thus enabling the harvester to move to a position immediately adjacent the receptacle for dumping, and precluding any significant loss of cotton during the dumping process. The harvester head is moved to a symmetrically centered position again when dumping has been completed and the harvester moves away from adjacent obstacles.

The head assembly includes a rail which is permanently affixed (welded, bolted, etc.) to the rear of the harvester head assembly. The rail is in turn slidably mounted on a stationary main frame, which is affixed to the lift arm structure of the harvester. The main frame and rail interface may include rollers and other friction reducing means therein, e.g., Teflon (tm) material, etc. The rail and its affixed harvester head assembly is actuated by a laterally disposed hydraulic cylinder or ram, with the cylinder preferably being secured to the main frame and the piston or ram preferably being secured to the harvester head assembly. The hydraulic system is operated remotely by a control system in the operator's cab of the harvester machine.

Accordingly, it is a principal object of the invention to provide an improved laterally adjustable harvester head assembly for a cotton harvester machine, providing for the head assembly to be adjusted laterally as desired so that at least one lateral end thereof extends no further than the lateral limits of the harvester machine.

It is another object of the invention to provide an improved laterally adjustable harvester head assembly which is actuated by hydraulic means remotely controlled from the cab of the harvester.

It is a further object of the invention to provide an improved laterally adjustable harvester head assembly including a rail which is movably installed to the harvester main frame and set in low friction rollers therebetween, with the rail having the harvester head assembly affixed thereto.

An additional object of the invention is to provide an improved cotton harvesting machine incorporating a laterally adjustable harvester head assembly and control system therefor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
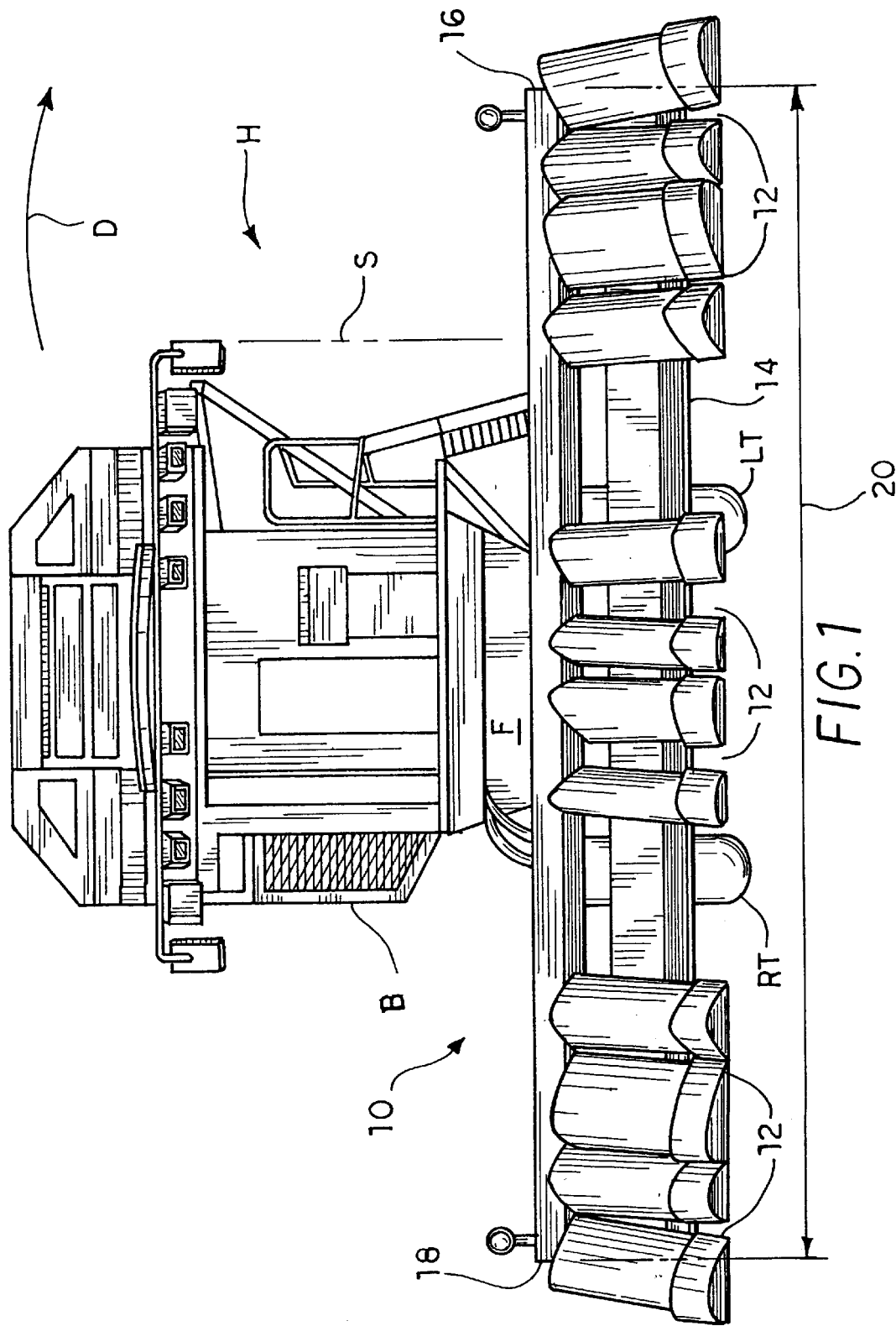
FIG. 1 is a front perspective view of a cotton harvester showing the head assembly and individual harvesting head units thereon, with the harvester head assembly being symmetrically positioned for normal harvesting operations.
Figure 2:
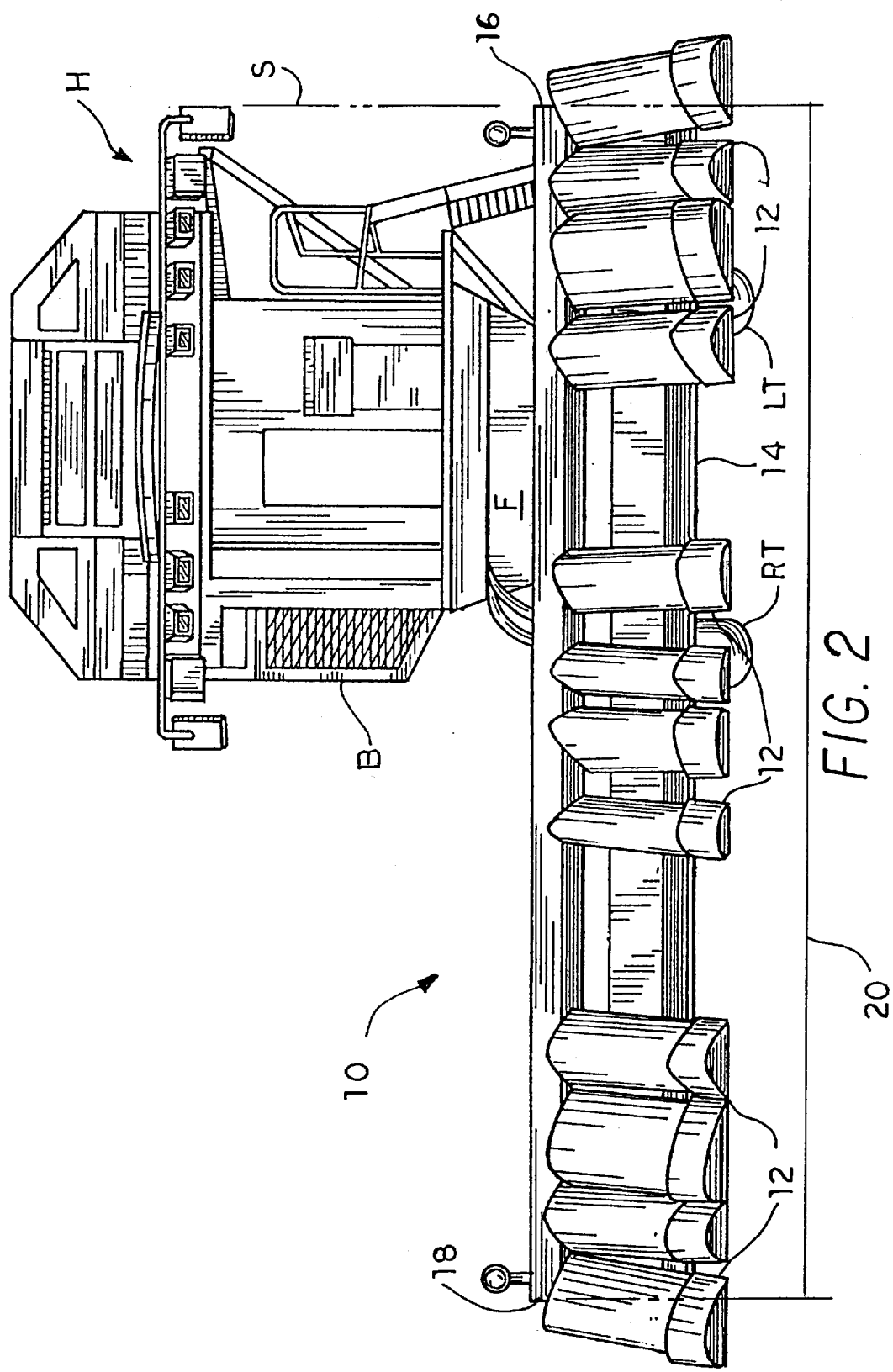
FIG. 2 is a front perspective view of the harvester of FIG. 1, with the head assembly adjusted laterally to the right side of the harvester to position the left end of the head assembly essentially flush with the left side of the balance of the machine.

The present invention comprises a laterally and linearly adjustable harvesting head assembly 10 which is attachable to the front end F of a harvester or harvesting machine H, as shown generally in FIGS. 1 and 2. The assembly 10 includes a plurality of individual harvesting heads 12 installed thereon and adjustably positionable therealong. The present invention is particularly well suited for use in the harvesting of cotton, but it may be readily adapted for use in harvesting other row crops, particularly where side access to the harvester is impeded by the lateral extension of the relatively wide harvesting head assembly 10 beyond the side(s) of the powered mobile harvester vehicle H itself.

Such harvesters H conventionally include a rear collector bin B having a generally central collection position, and mechanized to tilt toward one side (e.g., the first side S, shown at its maximum extent) of the harvester H to dump the collected cotton or other crop into a receiving bin (truck or other collection point, etc.), as indicated generally by the directional arrow D in FIG. 1. Such a conventional harvester is disclosed generally in U.S. Pat. No. 4,255,919 to Copley et al. and discussed above in the discussion of the related art. Such harvesters conventionally include means to tilt or tip the collector bin laterally into a collection receptacle, but lateral movement of the bin is generally limited, in order to preclude shifting the center of gravity of the entire apparatus beyond the wheel track of the harvester machine, and thereby causing the harvester to tip over.

This raises a problem, considering the need for the harvester to park laterally next to the receiving bin in order to dump the contents of the harvester collection bin into the receiving bin. As the harvester head assembly conventionally extends laterally well beyond the width of the harvester vehicle itself behind the head assembly, it will be seen that it can be difficult or perhaps impossible to move the harvester to a position immediately adjacent the receiving collector. The result can be a great deal of spilled cotton or other crop, due to the distance between the harvester and the receiving collector, due to the inability to position the harvester immediately adjacent the receiver because of the relatively wide harvester head assembly disposed across the front of the harvester and extending beyond each side thereof.

The present invention responds to this problem by providing a linearly and laterally movable harvesting head assembly 10, which may be attached to a cotton harvester such as the harvester H of FIGS. 1 and 2. The head assembly 10 comprises a rigid and linear structure 14 having a first end 16 and an opposite second end 18, defining a width 20 therebetween (which may include the outer portions of the distally positioned individual harvester heads 12) which is considerably wider than the width of the harvester H. This allows the harvester H, and its attached harvesting head assembly structure 14, to harvest multiple rows of crops simultaneously, but leads to the lateral clearance problem cited above when the need arises to park the harvester H immediately adjacent some other structure.

FIGS. 3 through 6 provide rear views of the harvester head assembly structure 14 shown generally in FIGS. 1 and 2. The structure 14 includes a continuous, unbroken, unitary rear frame 22 (the length is shown completely in FIGS. 5 and 6) extending essentially the entire width of the harvester head assembly structure 14. The rear frame 22 comprises an upper edge member 24 and an opposite lower edge member 26 (shown more clearly in FIG. 4), separated by a plurality of crossmembers 28. An upper rail 30 and opposite lower rail 32 are affixed respectively to the upper edge 24 and lower edge 26 of the frame 22. These two tracks or rails 30 and 32 extend continuously substantially the entire width of the rear frame 22 and thus the harvester head assembly structure 14. The two tracks or rails 30 and 32 serve as the harvesting machine attachment means for movably securing the structure 14 to the front end F of the harvester H, for laterally moving the structure 14 relative to the harvester H.

The fixed harvester head attachment means at the front F of the harvester H to which the rear frame 22 of the harvester head assembly 10 attaches, is of a similar configuration to the movable harvester head rear frame 22 discussed above. The harvester head attachment means comprises a frame 34 which is immovably affixed to the harvester H (or to a lift apparatus of the harvester H, enabling the frame 34 and attached laterally movable harvester head assembly 10 to be lifted or lowered as desired). The frame 34 is formed of an upper and opposite lower lateral member, respectively 36 and 38, with a plurality of crossmembers 40 disposed therebetween.

The two laterally immovable members 36 and 38 comprising the cooperating components of the harvester head attachment means 34 of the harvesting machine H, seat within the corresponding rails or tracks 30 and 32 of the rear frame 22 of the laterally movable harvester head assembly 10. A hydraulic ram 42 is installed laterally between the fixed frame 34 and the laterally movable frame 22, with the cylinder 44 of the ram 42 being secured to an attachment plate 46 which is affixed to the fixed frame 34 of the harvester H, and the strut 48 of the ram 42 being secured to an attachment plate 50 affixed to the relatively movable harvester head frame 22. Hydraulic fluid under pressure is supplied to the ram 42 by a hydraulic line 52, which communicates with a conventional hydraulic supply system (pump, regulator, reservoir, remote hydraulic valve, etc.). Other powered means, such as a chain drive, jack screw, etc., may be used to move the harvester head frame 22 relative to the fixed frame 34 of the harvester H.

In order to reduce the forces required in the hydraulic system, and to reduce stress in the various components of the device, low friction means may be provided between the harvesting machine attachment means of the harvester head rear frame (i. e., the tracks or rails 30 and 32) and the harvester head attachment means of the harvester (i. e., the upper and lower members 36 and 38 of the fixed frame extending from the front of the harvester H). The low friction means may comprise coatings or strips of low friction material 54 (e.g., Teflon, tm) as shown in FIGS. 3 and 7, and/or a plurality of rollers or wheels 56, shown in FIG. 7.

Figure 7:
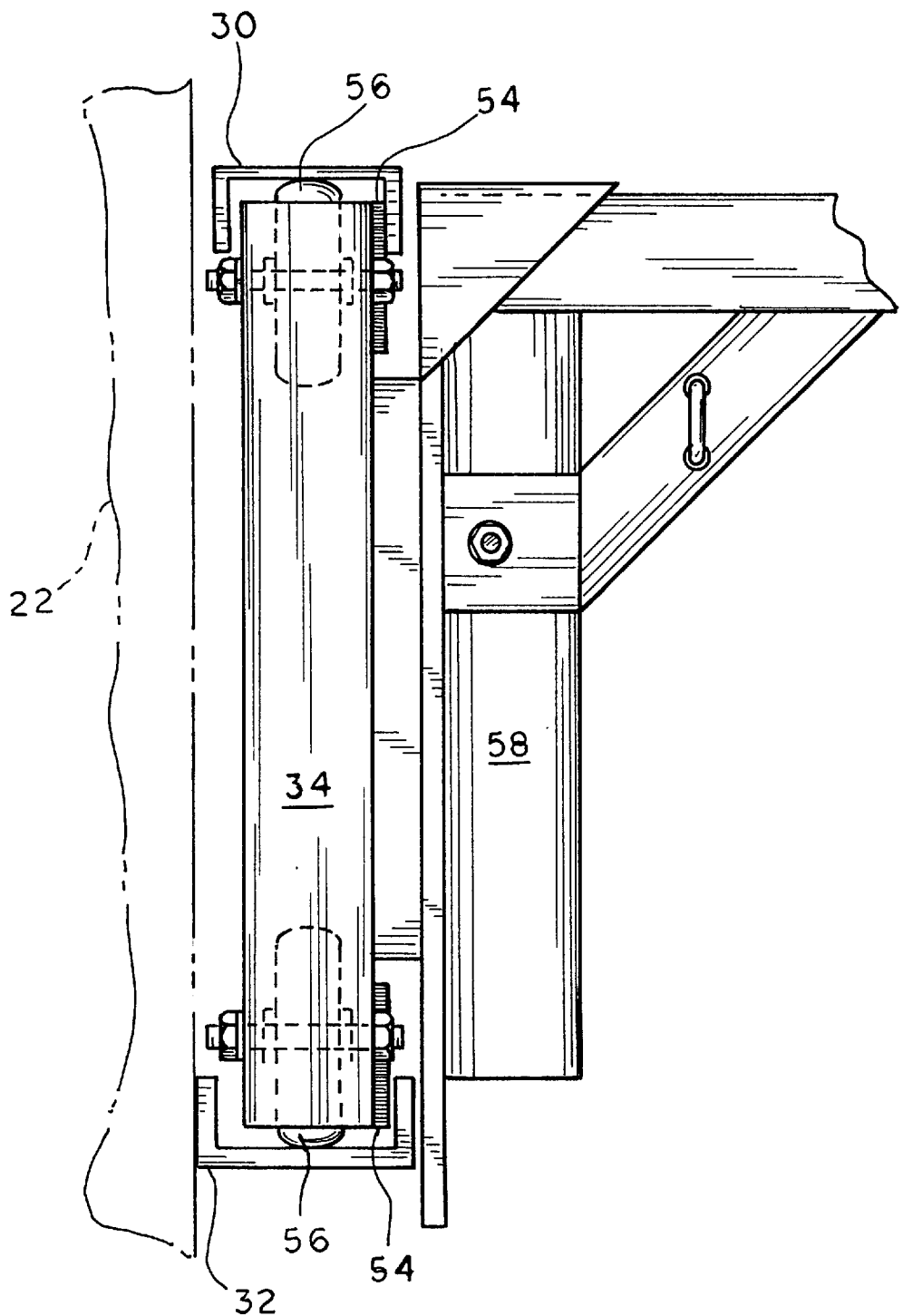
FIG. 7 is a left side elevation view of the installation of the upper and lower rails of the movable head assembly on the laterally fixed lift arm structure of the harvester machine.

FIG. 7 also provides a left side elevation view more clearly showing the relative fore and aft positioning of the fixed and movable frames of the present laterally adjustable harvester head assembly. In FIG. 7, the harvester vehicle H would be to the right side of the drawing, with the movable harvester head assembly structure to the left. The rear frame 22 of the harvester head assembly structure is shown generally in broken lines to the left side of FIG. 7, with the upper and lower rails or tracks 30 and 32 affixed thereto (welded, etc.) and extending rearwardly therefrom.

The laterally fixed frame 34 (i. e., the frame extending forwardly from the front of the harvester, upon which the laterally movable harvester head 10 is installed by means of the rails 30 and 32), is affixed (welded, etc.) to the front of a pair of vertical lift arms 58 (one of which is shown in the side elevation view of FIG. 7), which extend forwardly from the front of the harvester and articulate upwardly and downwardly to lift the harvester head 10 from the ground for clearance as desired. The harvester head rear frame 22, and its attached rails 30 and 32, would thus move back and forth normal to the plane of the drawing, when the mechanism of the present invention is operated.

Figure 3:
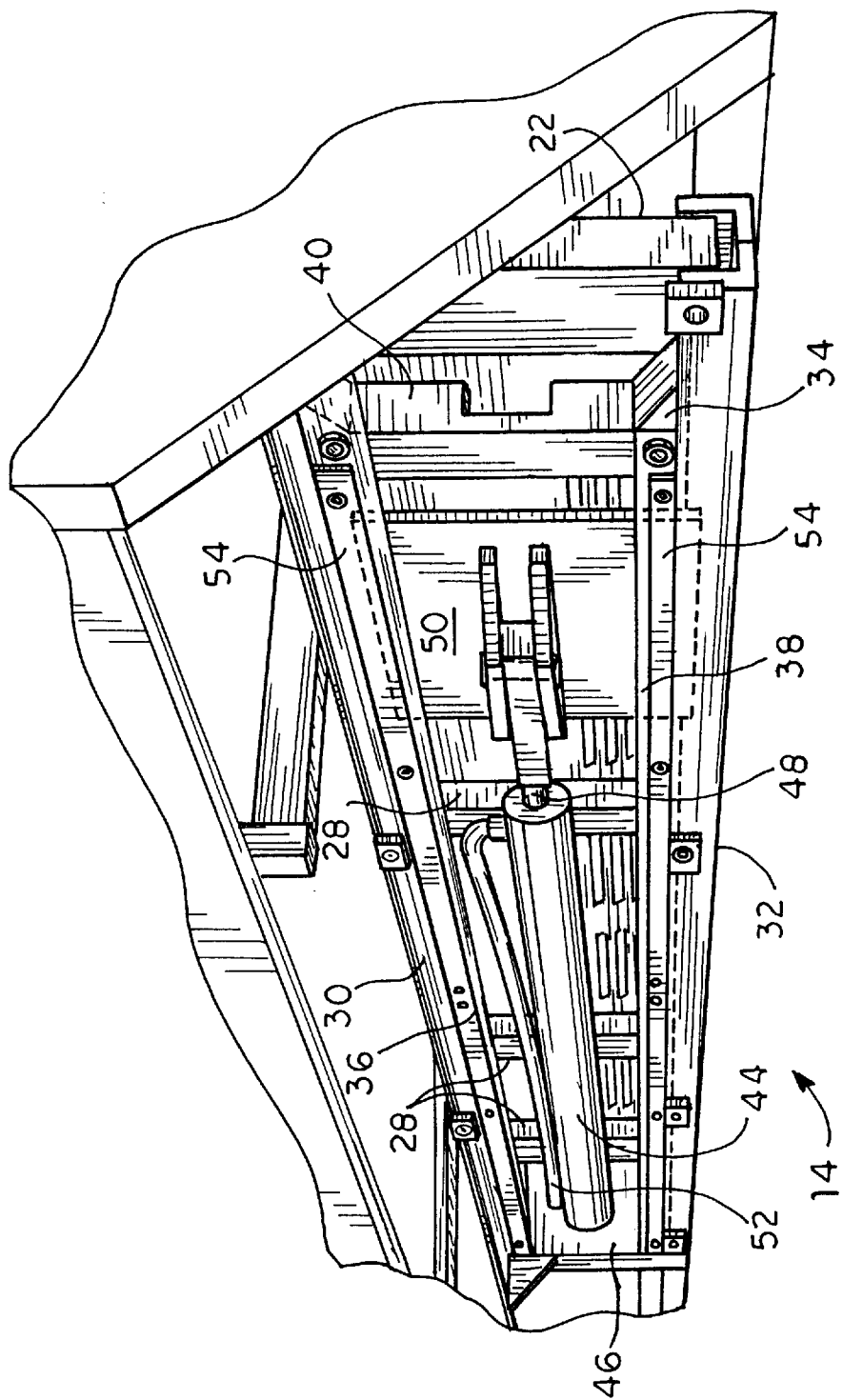
FIG. 3 is a right rear perspective view (looking forward and to the left) of the movable head assembly in a working position corresponding to the position shown in the front perspective view of FIG. 1, with the head assembly essentially symmetrically positioned relative to the harvester machine.
Figure 4:
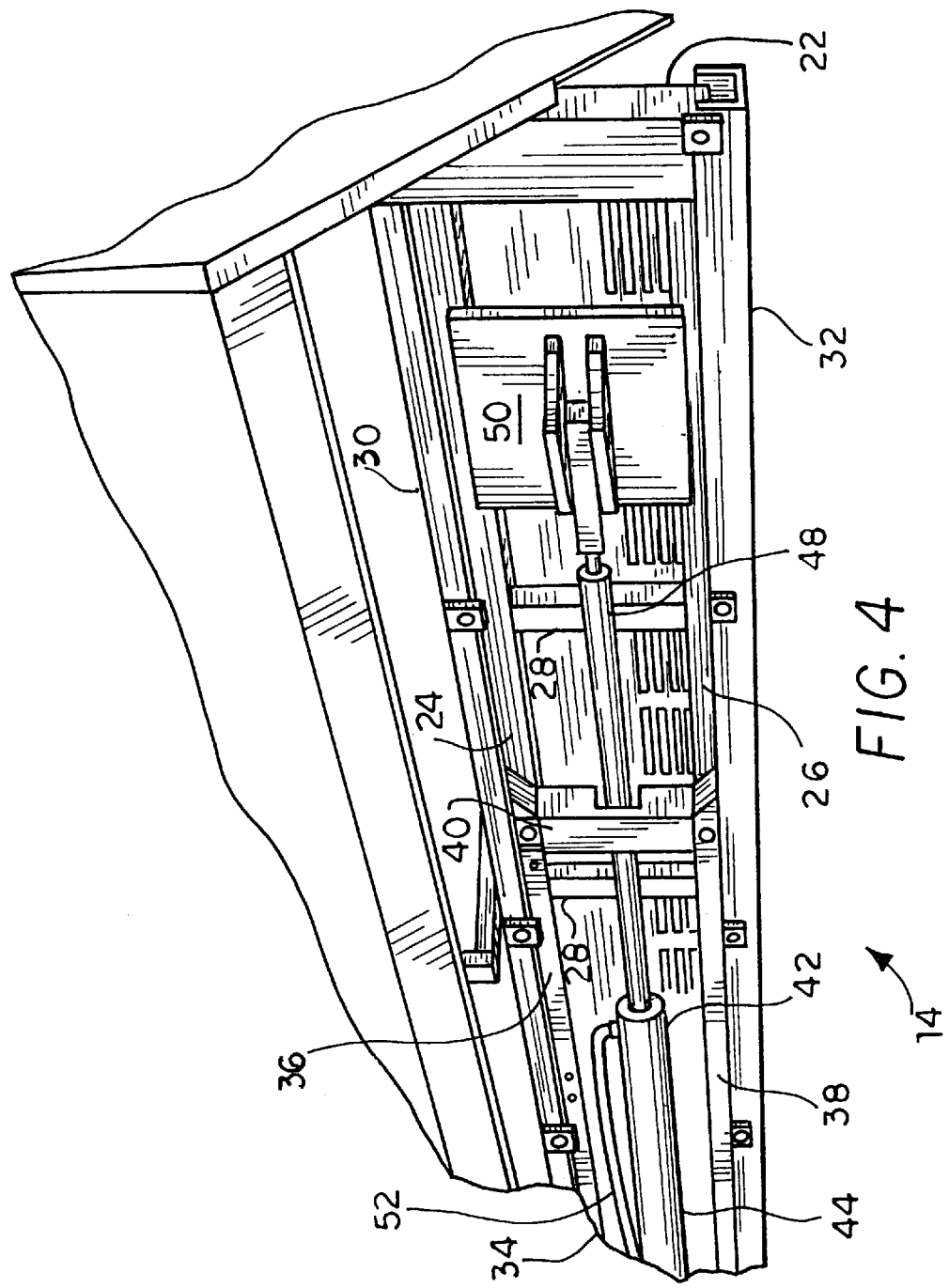
FIG. 4 is a right rear perspective view (looking forward and to the left) of the head assembly extended to the right and corresponding to the position shown in the front view of FIG. 2, positioning the left end of the assembly essentially coplanar with the left side of the machine.
Figure 5:
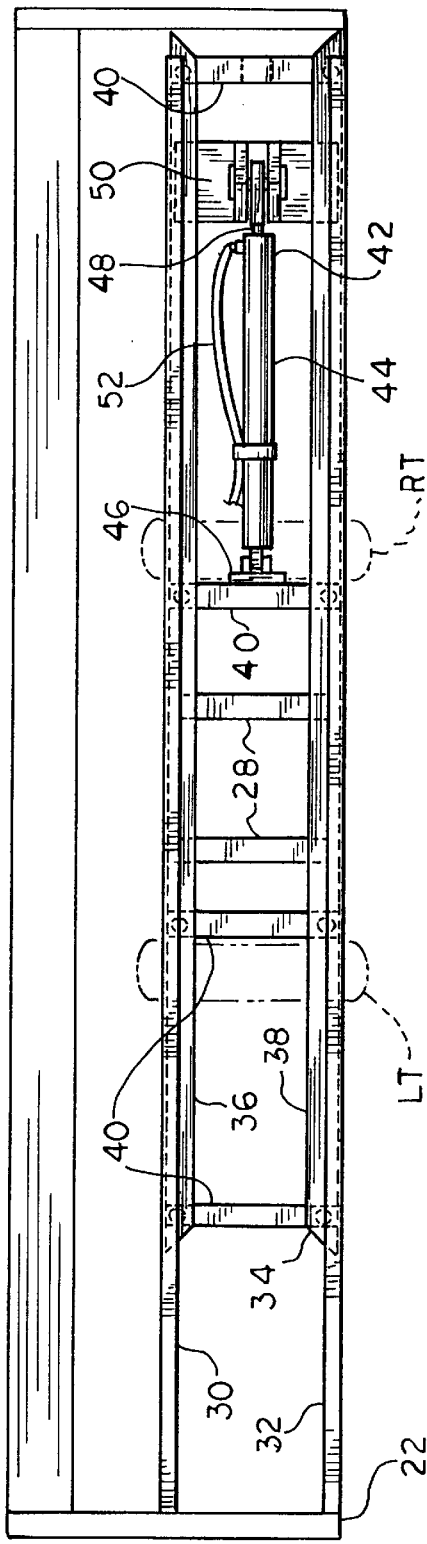
FIG. 5 is a rear elevation view (looking forward) of the movable harvester head assembly, showing the retraction of the actuating ram and relative position of the assembly and vehicle wheels with the head assembly in the central or operating position of FIGS. 1 and 3.
Figure 6:
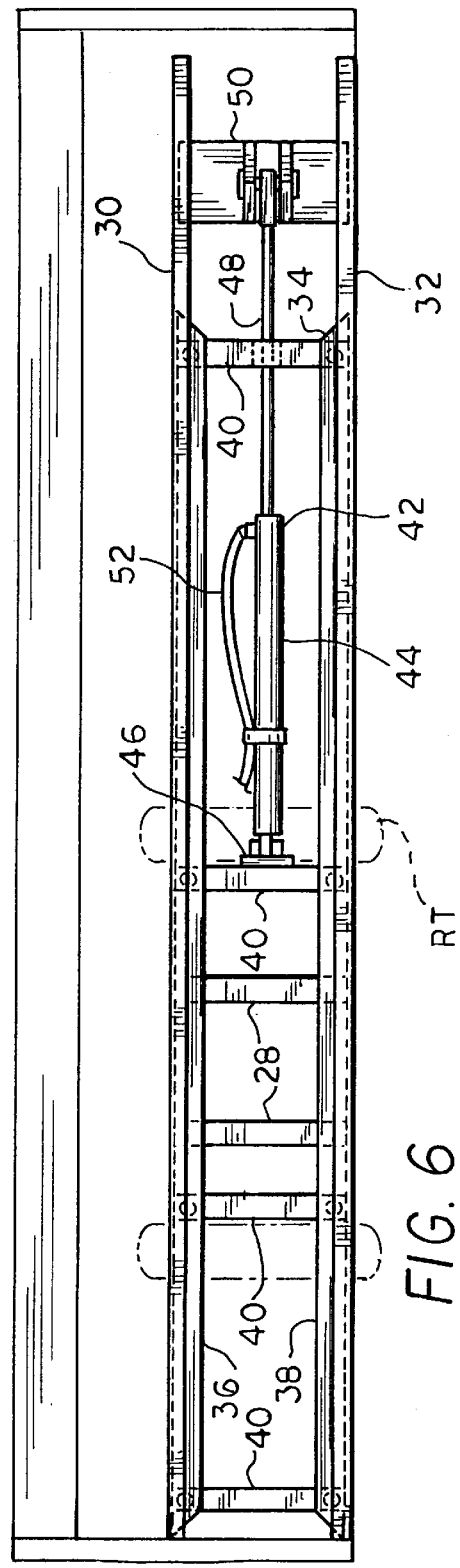
FIG. 6 is a rear elevation view (looking forward) of the movable harvester head assembly, showing the extension of the actuating ram and relative position of the assembly and vehicle wheels with the head assembly extended to the right, to position the left end of the head assembly essentially even with the left side of the vehicle, as shown in FIGS. 2 and 4.

The harvester head assembly 10 is normally placed in a generally laterally symmetrical working position relative to the harvester machine H for the harvesting cotton or other crops, or for moving the harvester H from one location to another on the road, as shown in FIGS. 1, 3, and 5 of the drawings. When the collector bin B of the harvester H is filled, the harvester H may be driven to a collection point for the dumping of the crop gathered within the bin B. As the harvester H approaches the stationary receiving or collection point for the gathered crop, the operator of the harvester H may engage the hydraulic ram 42 by means of a conventional remote switch or valve within the cab of the harvester, thus extending the strut 48 from the cylinder 44 and linearly translating or driving the laterally movable harvester head 10 to the position shown in FIGS. 2, 4, and 6.

It will be seen that this linear and lateral repositioning of the harvester head 10 to the laterally offset position shown in FIG. 2, also positions the first end 16 of the harvester head 10 essentially in coplanar alignment with the first side S of the harvester H (as defined by various components extending therefrom), as shown in FIG. 2. The relative lateral positioning of the movable frame 22 and the fixed frame 34 is made more clear in FIGS. 5 and 6, by the broken line showing of the relative positions of the left and right tires LT and RT of the harvester. Thus, the harvester H may be positioned immediately adjacent a stationary receiving container (not shown), and the contents of the conventional laterally dumping bin B of the harvester H dumped directly therein, without concern for spillage or loss of the gathered material within the bin B, due to the harvester H being parked at some distance from the stationary receiving point because of the lateral extension of the harvester head assembly 10.

When the material which had been contained within the bin B has been dumped, the harvester H is moved away from the collection point (and any other lateral obstacles), and the harvester head assembly 10 moved back to a laterally central or symmetrical position for further harvesting, or for movement of the harvester H over public roads or other roadways as required. The head assembly 10 might be moved somewhat laterally to the right while traveling on the road, assuming sufficient shoulder clearance, in order to provide greater clearance for oncoming traffic. In some circumstances (crowned roads, etc.) this may not be desirable due to the shift of the lateral center of gravity, and a lockout may be provided to preclude lateral movement of the harvester head assembly 10 while the harvester H is in motion, or some other limiting means provided to preclude excessive offset of the harvester head assembly during over the road travel of the harvester.

In summary, the present laterally movable harvester head assembly, and harvester to which the head assembly may be installed, provides a significant advantage for the operator of such harvesting machinery. The operator need only operate the appropriate control to move the head assembly laterally and linearly to one side, thereby removing essentially all major lateral obstacles extending from the harvester to the side to which the collection bin is laterally dumped. This allows the harvester to be positioned immediately adjacent the collection point, thus greatly reducing the amount of time required to position the harvester optimally with a conventional laterally fixed harvester head assembly, and further reducing the amount of time required for cleanup of spilled crops when the harvester is positioned some distance away from the collection point. The present laterally movable harvester head extension will be seen to pay for itself in a relatively short period of time, by reducing the turnaround time at the collection point and further reducing the amount of harvested crop which is spilled using conventional harvesters.

It is to be understood that the present invention is not limited to the sole embodiment described above, but encompasses any and all embodiments within the scope of the following claims.

I claim:

1. A laterally movable harvester head assembly for a harvesting machine having at least harvester head attachment means laterally immovably affixed thereto and a collector bin dumping side, said assembly including at least:

a movable harvester head assembly structure having a first end and an opposite second end defining a harvester head assembly width therebetween and being wider than the harvesting machine;

a continuous, unbroken, unitary rear frame immovably affixed to said harvester head assembly structure and extending substantially the entire width thereof;

harvesting machine attachment means extending substantially from said first end to said second end of said rear frame, for movably securing said structure to the harvester head attachment means of the harvesting machine for laterally moving said structure relative to the harvesting machine;

harvesting means comprising a plurality of laterally disposed harvesting heads secured to said structure; and means for selectively moving said structure linearly and laterally relative to the harvester head attachment means of the harvesting machine between a working position substantially symmetrically disposed relative to the harvesting machine and a dumping position with said first end of said structure positioned substantially coplanar with the collector bin dumping side of the harvesting machine as desired.

2. The harvester head assembly according to claim 1, wherein said rear frame includes an upper edge member and opposite lower edge member, and said harvesting machine attachment means comprises a rearwardly disposed upper rail and lower rail immovably affixed respectively to said upper edge member and said lower edge member of said rear frame and extending continuously therealong.

3. The harvester head assembly according to claim 1, including powered harvester head assembly structure movement means.

4. The harvester head assembly according to claim 3, wherein said powered harvester head movement means comprises a laterally disposed hydraulic cylinder and strut installed between said harvesting machine and said harvester head assembly structure.

5. The harvester head assembly according to claim 1, including means for remotely controlling movement of said harvester head assembly structure.

6. The harvester head assembly according to claim 1, including a low friction coating disposed between said harvesting machine attachment means of said rear frame and said harvester head attachment means of the harvesting machine.

7. The harvester head assembly according to claim 1, including a plurality of rollers disposed between said harvesting machine attachment means of said rear frame and said harvester head attachment means of the harvesting machine.

8. The harvester head assembly according to claim 1, wherein said harvesting heads are adjustably positionable laterally along said harvester head assembly structure.

9. A powered harvesting machine and harvester head assembly therefor, comprising in combination:
   a harvester including at least a first side, a rearwardly disposed collector bin having a generally centrally disposed collection position and a dump position laterally displaced beyond said first side of said harvester, and a front end;
   a laterally movable harvester head assembly structure extending forwardly from said front end of said harvester;
   said harvester head assembly structure having a first end and an opposite second end defining a harvester head assembly width therebetween and being wider than said harvester;
   a continuous, unbroken, unitary rear frame immovably affixed to said harvester head assembly structure and extending substantially the entire width thereof;
   harvesting machine attachment means extending substantially from said first end to said second end of said rear frame, for movably securing said structure to said front end of said harvester for laterally moving said structure relative to said harvester;
   harvesting means comprising a plurality of laterally disposed harvesting heads secured to said structure; and
   means for selectively moving said harvester head assembly structure linearly and laterally relative to said harvester head attachment means of said harvester between a working position substantially symmetrically disposed relative to said harvester and a dumping position with said first end of said structure positioned substantially coplanar with said harvester first side as desired.

10. The harvesting machine and harvester head assembly combination according to claim 9, wherein said rear frame of said harvester head assembly structure includes an upper edge member and opposite lower edge member, and said harvesting machine attachment means comprises a rearwardly disposed upper rail and lower rail immovably affixed respectively to said upper edge member and said lower edge member of said rear frame and extending continuously therealong.

11. The harvesting machine and harvester head assembly combination according to claim 9, including powered harvester head assembly structure movement means.

12. The harvesting machine and harvester head assembly combination according to claim 11, wherein said powered harvester head assembly structure movement means comprises a laterally disposed hydraulic cylinder and strut installed between said harvester and said harvester head assembly structure.

13. The harvesting machine and harvester head assembly combination according to claim 9, including means for remotely controlling movement of said harvester head assembly structure.

14. The harvesting machine and harvester head assembly combination according to claim 9, including a low friction coating disposed between said harvesting machine attachment means of said rear frame and said harvester head attachment means of said harvester.

15. The harvesting machine and harvester head assembly combination according to claim 9, including a plurality of rollers disposed between said harvesting machine attachment means of said rear frame and said harvester head attachment means of said harvester.

16. The harvesting machine and harvester head assembly combination according to claim 9, wherein said harvesting heads are adjustably positionable laterally along said harvester head assembly structure.

* * * * *